United States Patent Office 3,247,180
Patented Apr. 19, 1966

3,247,180
NONADECAPEPTIDES AND INTERMEDIATES
FOR THE PREPARATION THEREOF
Robert Schwyzer and Beat Iselin, Riehen, Heini Kappeler, Birsfelden, Werner Rittel, Basel, and Bernhard Riniker, Reinach, Basel-Land, Switzerland, assignors to Ciba Corporation, a corporation of Delaware
No Drawing. Filed June 5, 1961, Ser. No. 114,609
Claims priority, application Switzerland, July 29, 1960, 8,658/60; Oct. 24, 1960, 11,882/60; Nov. 17, 1960, 12,903/60; Dec. 6, 1960, 13,641/60
13 Claims. (Cl. 260—112.5)

The present invention relates to a new nonadecapeptide of the formula L-seryl-L-tyrosyl-L-seryl-L - (X)-L-glutaminyl-L-histidyl-L - phenylalanyl-L-arginyl - L-tryptophyl-glycyl - L-lysyl-L-prolyl-L - valylglycyl - L-lysyl-L-lysyl-L-arginyl-L-arginyl-L-proline and of the corresponding compound which contains the radical of glutamic acid instead of the glutaminyl radical, and of the derivatives and acid addition salts. X represents the radical of an α-lower alkyl-α-aminoacetic acid in which the lower alkyl radical contains at most 4 carbon atoms and which is unsubstituted or is substituted by a mercapto or lower alkylmercapto group, preferably the methylmercapto group, or the sulfoxide or sulfone radical thereof, for example alanyl, valyl, leucyl, isoleucyl, α-aminobutyryl, cysteyl, methionyl and its sulfoxide and sulfone.

The derivatives are above all functional derivatives such as esters, amides, or hydrazides, or also N-substitution products such as N-acyl, more especially N-acetyl derivatives, and compounds containing the usual amino protective groups.

The new compounds display MSH action and are very efficient adrenocorticotropic substances and are, therefore, intended to be used as medicaments. They can further be used as intermediates for the manufacture of medicaments containing a long amino acid chain, such as the adrenocorticotropic hormones themselves.

Outstanding as regards the adrenocorticotropic effect are, in particular, compounds of the above formula in which X stands for methionyl.

The new nonadecapeptides are obtained by the methods known for the manufacture of peptides, the amino acids in the indicated order being linked together singly or in the form of previously synthesised smaller peptide units. Thus, one of the amino acid or peptide molecules in the form of an ester can be linked with a further amino acid or peptide molecule containing a protected amino group, in the presence of a condensing agent such as a carbodiimide or of a phosphorous acid ester halide; alternatively, the amino acid or peptide ester containing a free amino group may be reacted with an amino acid or with a peptide with active carboxyl group (and protected amino group), for example, an acid halide, azide, anhydride, imidazolide, enol ether according to Woodward or with an activated ester such as cyanomethyl ester tected amino group) may be reacted with an amino acid or a peptide contained a free carboxyl group (and a protected amino group) m aybe reacted with an amino acid or with a peptide containing an activated amino group (and a protected carboxyl group), for example, with a phosphiteamide. All aforementioned methods are suitable for any formation of peptide linkages according to the invention, but the methods used in the Examples are particularly advantageous.

As mentioned above there are various possibilities of synthesising the nonadecapeptide from the amino acids or smaller peptide units. According to one process, for example, the decapeptide L-seryl-L-tyrosyl-L-(X)-L- glutaminyl- (or glutamyl)-L-histidyl - L-phenyl-alanyl-L-arginyl-L - tryptophyl - glycine is condensed with the nonapeptide L-lysyl-L-prolyl-L-valyl-glycyl-L - lysyl-L-lysyl-L-arginyl-L-arginyl-L-proline as shown for example in the Reaction Scheme 1 shown below for the compound that contains as the fourth aminocarboxylic acid L-methionine and as the fifth aminocarboxylic acid L-glutamine.

BOC represents a tertiary butyloxycarbonyl group, T the trityl-(triphenylmethyl) radical, and R represents hydrogen or the para-nitrophenyl radical. The decapeptide used as starting material can be prepared by the process described in U.S. patent application Serial No. 114,636, filed June 5, 1961, by Robert Schwyzer et al., and the pentapeptide by the process described in U.S. patent application Serial No. 46,893, filed August 2, 1960, by Robert Schwyzer et al. The tetrapeptide is obtained from the $N^\epsilon$-tertiary butyloxy-carbonyl-L-lysyl-L-propyl-L-valyl-glycine ethyl ester described in the afore-mentioned patent application Serial No. 46,893 by tritylation and hydrolysing the ester group.

The nonapeptide derivatives H-lys(BOC)-pro-val-gly-lys(BOC)-lys(BOC)-arg-arg-pro-$OC_4H_9$ suitable for the condensation with the decapeptide and the corresponding compound protected at the arginyl radicals by nitro groups are advantageously prepared with the use of the

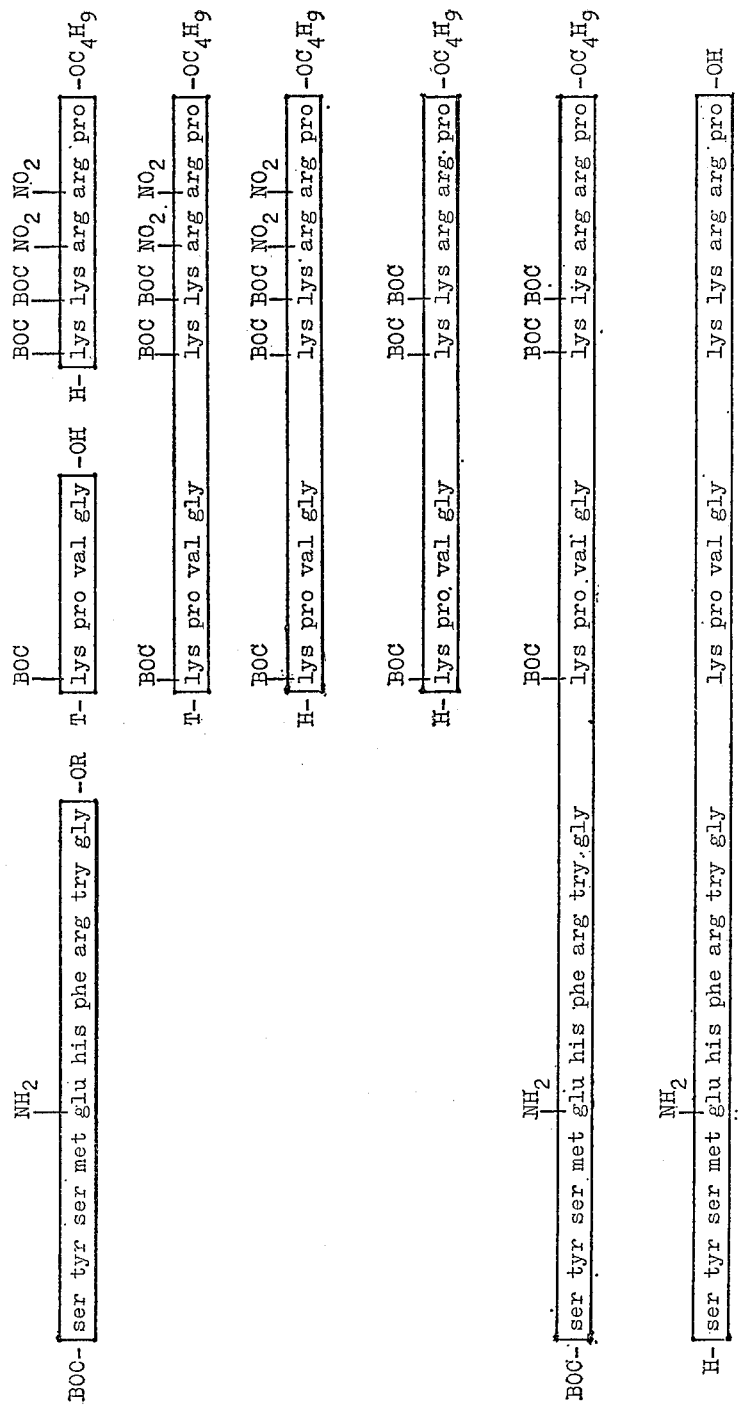
Scheme 1.

trifluoroacetyl radical (TFA) as protective group according to the Reaction Scheme 2 shown below.
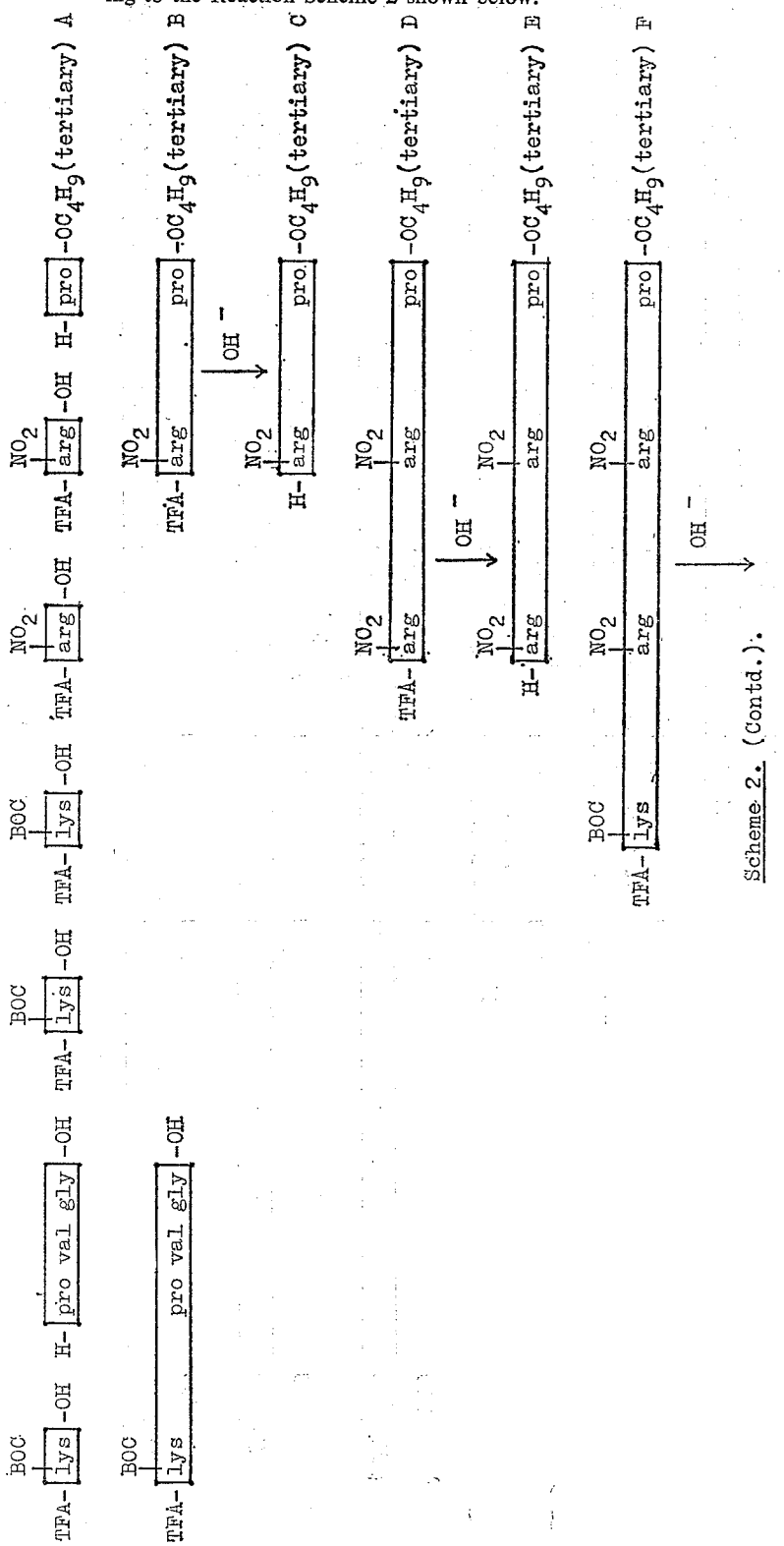
Scheme 2. (Contd.).

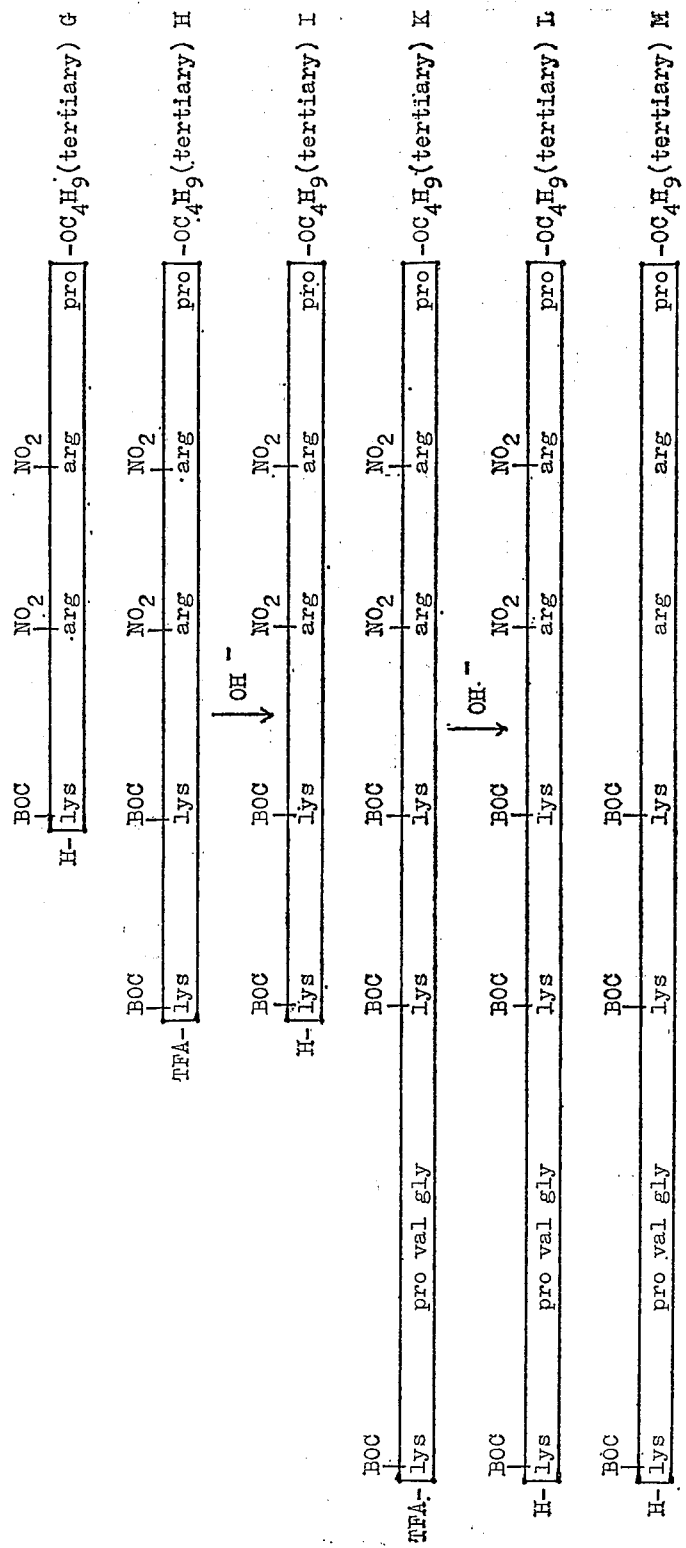
Scheme 2.

Instead of the trifluoroacetyl (or trityl) radical there may be used a group that can be eliminated by hydrogenolysis, for example, the carbobenzoxy group (Z), the para-(phenylazo)-benzyloxy-carbonyl group (PZ) or the para-(para'-methoxy-phenylazo)-benzyloxy-carbonyl group (MZ) for protecting the α-amino group of lysine in the tetrapeptide H-lys-pro-val-gly-OH; in this case the elimination of the α-amino protective group of stage K in Scheme 2 yields the product M directly.

The nonadecapeptide is also obtained by condensing the tetrapeptide synthesised from the first four amino acids with the pentadecapeptide synthesised from the following 15 amino acids, for example, according to Reaction Schemes 3 and 4 shown below.

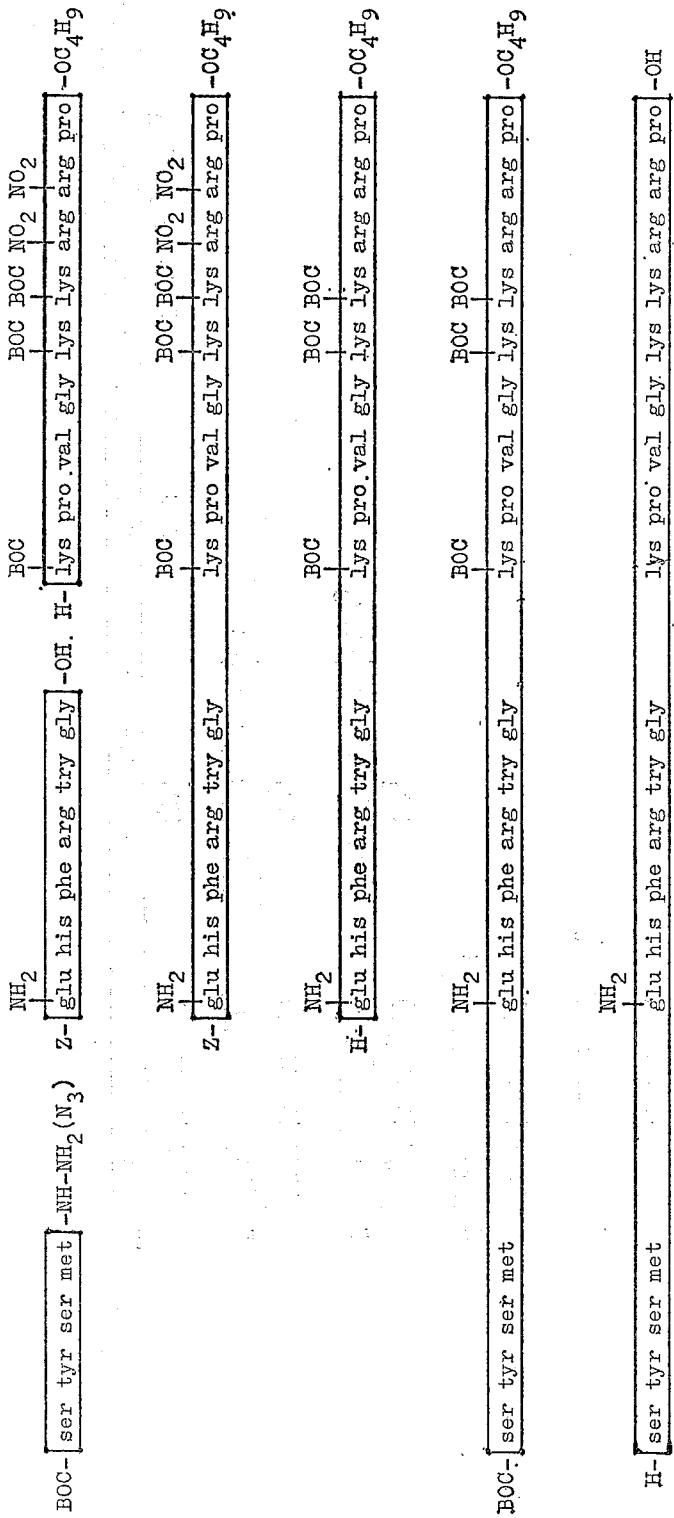

Scheme 3.

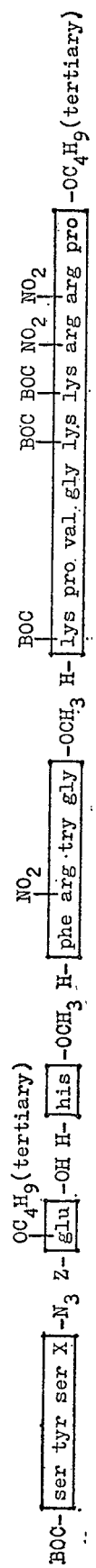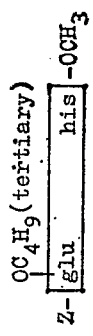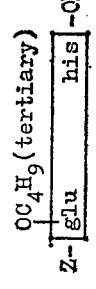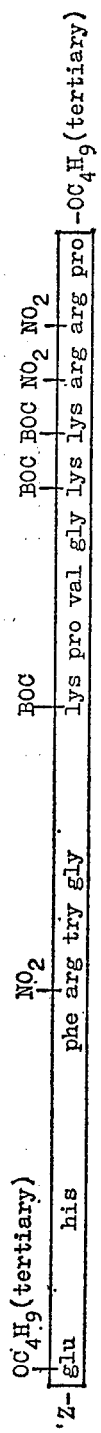
Scheme 4 (Contd.).

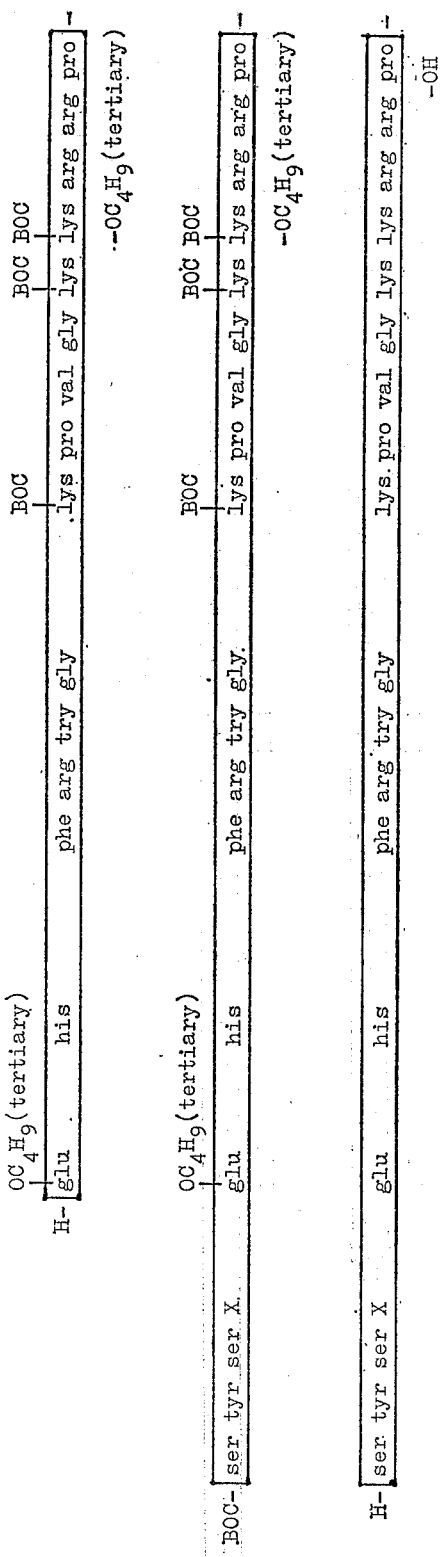
R = -OH, -N$_3$ (or -NH-NH$_2$) -OC(=O)-OR', -OCR'(=O), -OCH$_2$-El, -OC$_6$H$_4$-El (para)
R' = lower alkyl; El = electron-attracting substituent, e.g. -NO$_2$, -CN
Scheme 4.

The tetrapeptide derivative BOC - ser - tyr - ser - met-NH—NH₂ used as starting material can be prepared by the process described in the afore-mentioned patent application Serial No. 114,636, as can the tetrapeptides in which X represents an amino acid other than methionine. The hexapeptide derivative H-glu(NH₂)-his-phe-arg-try-gly-OH has been described in U.S. patent application Serial No. 822,187, filed June 23, 1959, now U.S. Patent No. 3,093,627, by Robert Schwyzer et al., and the tetrapeptide derivative H-phe-arg(NO₂)-try-gly-OCH₃ in U.S. patent application Serial No. 91,651, filed February 27, 1961, by Robert Schwyzer et al.

When using L-glutamic acid as the fifth amino acid (see Reaction Scheme 4) it has been found advantageous to protect the γ-carboxyl group by the tertiary butyl radical since the tertiary butyl ester is substantially more stable towards alkaline hydrolysis than, for example, the methyl, ethyl, benzyl or para-nitrobenzyl ester so that these ester groups can be selectively hydrolysed under alkaline conditions.

Furthermore, a tripeptide of the formula L-seryl-L-tyrosyl-L-serine can be condensed with the hexadecapeptide formed from the succeeding 16 amino acids, for example as shown in Reaction Scheme 5 shown below.

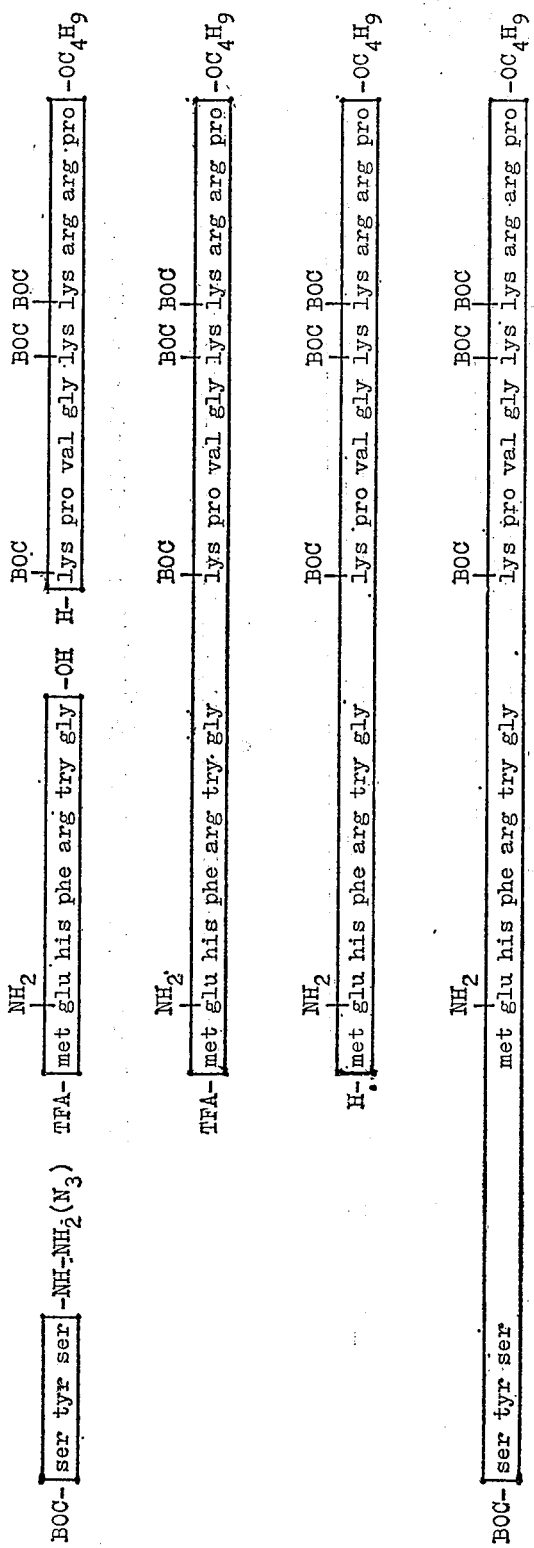

Scheme 5.

The heptapeptide-trifluoro-acetyl derivative used as starting material can be prepared by reacting the free heptapeptide described in the afore-mentioned patent application Serial No. 91,651 with trifluoroacetic acid phenyl ester; the tripeptide hydrazide has been described in the afore-mentioned patent application Serial No. 114,636.

According to another process the tetradecapeptide synthesised from the first 14 amino acids is condensed with the pentapeptide of the succeeding amino acids, for example according to the Reaction Scheme 6 shown below.

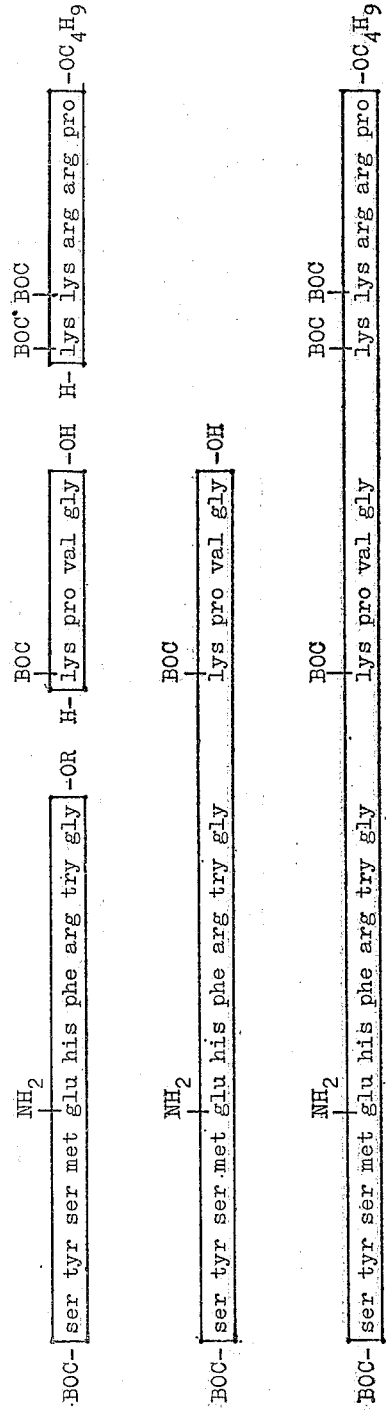

Scheme 6.

The tetrapeptide derivative used as starting material can be prepared from the N^α-para-phenylazo-benzyloxy-carbonyl-N^ε-tertiary butyloxycarbonyl - L - lysyl-L-prolyl-L-valyl-glycine desribed in the afore-mentioned patent application Serial No. 46,893 by hydrogenolytic elimination of the N^α protective group.

When X represents an amino acid other than methionine (for example, one that can be converted into methionine, such as methionine sulfoxide), the nonadecapeptide can also be prepared according to Reaction Scheme 7 shown below by stepped synthesis from the individual amino acids starting from the carboxyl end with the use of the afore-mentioned derivatives.

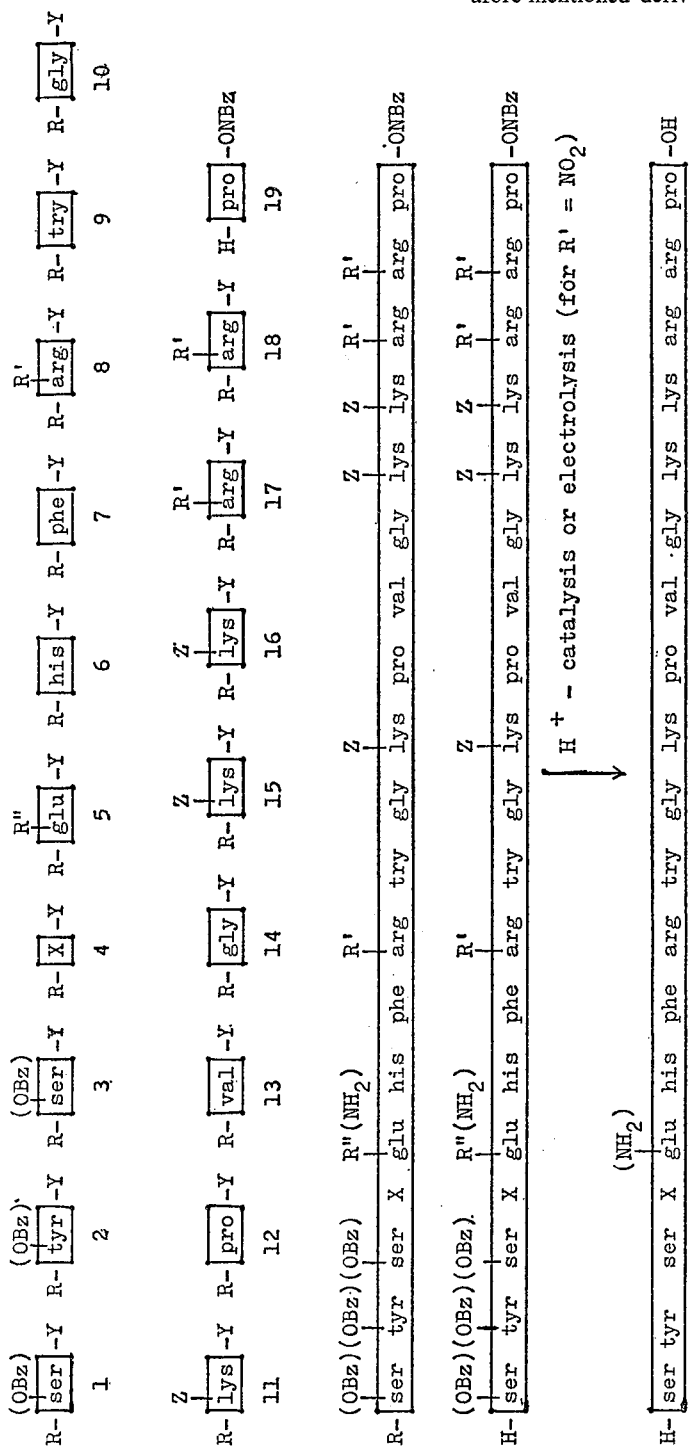

Scheme 7.

Any free of functional groups not participating in the reaction are advantageously protected, more especially by radicals that are easy to eliminate by hydrolysis or reduction, thus the carboxyl group preferably by esterification, for example, with a lower alkanol, for instance methanol, tertiary butanol, or a lower aralkanol, for instance benzyl alcohol or para-nitrobenzyl alcohol; the amino group, for example, by introducing the tosyl or trityl radical or the carbobenzoxy group or a colored protective group such as the para-phenylazo-benzyloxy carbonyl group or the para-(para'-methoxy-phenylazo)-benzyloxy-carbonyl group or more especially of the tertiary butyloxy carbonyl radical. For protecting the amino group in the guanido grouping of the guanido grouping of arginine the nitro group is suitable; however, it is not absolutely necessary to protect the afore-mentioned amino group of arginine during the reaction.

The conversion of a protected SH- or NH_2-group into a free group as well as the conversion of a functionally converted carboxyl group into a free carboxyl group in the course of the process for the manufacture of the nonadecapeptides and intermediates is carried out in the know manner by treatment with a hydrolysing or reducing agent respectively.

The invention further includes any variant of the present process in which an intermediate obtained at any stage of the process is used as starting material and the remaining step or steps is/are carried out, or the process is discontinued at any stage thereof, as well as the intermediates so obtained.

Depending on the reaction conditions employed the new compounds are obtained in the form of bases or of acid addition salts thereof. From the salts the bases can be prepared in as such known manner. By reacting the bases with acids suitable for performing therapeutically valuable salts, salts can be prepared such, for example, as those with inorganic acids such as hydrohalic acids, for example hydrochloric or hydrobromic acid, nitric thiocyanic, sulfuric or phosphoric acid, or with organic acids such as acetic, propionic, glycolic, lactic, pyruvic, oxalic, malonic, succinic, maleic, fumaric, tartaric, citric, benzoic, cinnamic, salicyclic, 2-phenoxybenzoic, 2-acetoxybenzoic, mandelic, methanesulfonic, ethanesulfonic, hydroxyethanesulfonic, benzenesulfonic or toluenesulfonic acid.

The nonadecapeptides obtained by the present process can be used in the form of pharmaceutical preparations which contain the peptide in admixture with a pharmaceutical organic or inorganic excipient suitable for enteral or parenteral administration. Suitable excipients are substances that do not react with the polypeptides such, for example, as gelatine, lactose, glucose, sodium chloride, starch, magnesium stearate, talc, vegetable oils, benzyl alcohols, gums, polyalkylene glycols, white petroleum jelly, cholestrol or other known medicinal excepients. The pharmaceutical preparations may be, for example, tablets, dragees, powders, ointments, creams or suppositories, or in liquid form solutions, suspension or emulsion. They may be sterilized and/or may contain assistants such as preserving, stabilizing, wetting or emulsifying agents. They may also contain further therapeutically useful substances.

The following examples illustrate the invention.

The paper chromatographic examinations were carried out with the following systems:

System 40: n-butanol-ethanol-water=2:2:1
System 41: tertiary butanol-n-butanol-water=4:3:3
System 42: n-propanol-ethyl acetate-water=7:1:2
System 45: secondary butanol-ammonia of 3% strength= 100:44
System 48: n - butanol - acetone - diethylamine-water= 10:10:2:5
System 49: secondary butanol triethylamine-diethylbarbituric acid-water-isopropanol=100:0.8:1.8g:60:10
System 50: tetriary amyl alcohol-isopropanol-triethylveronal-water 100:4:0:0.8:1.8g:50
System 52: n-butanol-acetic acid-water=100:10:30
System 54: secondary butanol-isopropanol-monochloroacetic acid-water=70:10:3g:40.

*Example 1.—$N^\alpha$-trityl-$N^\epsilon$-tertiary butyloxycarbonyl-L-lysyl-L-prolyl-L-valyl-glycine ethyl ester*

A solution of 963 mg. of $N^\epsilon$-tertiary butyloxy-carbonyl-L-lysyl-L-prolyl-L-valyl-glycine ethyl ester (prepared as described in the afore-mentioned patent application Serial No. 46,893, Example 13) in 15 cc. of absolute methylene chloride is treated with 561 mg. of pure etriphenylchloromethane and 0.31 cc. of absolute triethylamine and the solution is kept for 18 hours at room termperature. While cooling the methylene chloride solution with ice, it is washed with dilute citric acid solution and water, dried with sodium sulfate and evaporated. The residue (1.40 grams) is dissolved in a small amount of ether and precipitated with much petroleum ether, to yield 1.28 grams of $N^\alpha$-trityl-$N^\epsilon$-tertiary butyloxycarbonyl-L-lysyl-L-prolyl-L-valyl-glycine ethyl ester in the form of a powder melting at about 50 to 60° C. The product is suffiicently pure for further reactions.

*Example 2.—$N^\alpha$-trityl-$N^\epsilon$-tertiary butyloxylcarbonyl-L-lysyl-L-prolyl-L-valyl-glycine*

A solution of 1.20 grams of $N^\alpha$-trityl-$N\epsilon$-tertiary butyloxycarbonyl - L - lysyl-L-prolyl-L-valyl-glycine ethyl ester in 30 cc. of dioxane is treated with 7 cc. of water. The solution is then cooled to 2° C. and 2.0 cc. of N-sodium hydroxide solution are added. The whole is kept for one hour at 2° C. and then for another hour at room temperature, whereupon it is neutralized by adding a small amount of solid carbon dioxide. The solution is then evaporated to dryness and the remaining resin is treated with 30 cc. of water, a small amount of undissolved matter is filtered off and the filtrate is cooled to 2° C. and acidified to pH 2 with citric acid, whereupon the tetrapeptide derivative settles out as a fine gelatinous precipitate which is suctioned off, washed with much ice water until neutral and dried over sulfuric acid. Yield: 1.06 grams. Melting point about 86 to 117° C. The product is readily soluble in strongly dilute alkalies, sparingly soluble in water, readily soluble in tetrahydrofuran, dioxane, dimethylformamide and acetonitrile.

*Example 3.—(a) $N^\alpha$-trityl-$N^\epsilon$-tertiary butyloxycarbonyl-L - lysyl - L - prolyl - L - valyl - glycyl - ($N^\epsilon$ - tertiary butyloxycarbonyl) - L - lysyl - ($N^\epsilon$ - tertiary butyloxycarbonyl) - L - lysyl - nitro - L - arginyl - nitro - L-arginyl-L-proline-tertiary butyl ester*

A solution of 125 mg. of $N^\epsilon$-tertiary butyloxycarbonyl-L - lysyl - ($N^\epsilon$ - tertiary butyloxycarbonyl) - L - lysyl-nitro - L - nitro - L - arginyl - nitro - L - arginyl - L-proline-tertiary butyl ester (prepared as described in the aforementioned patent application Serial No. 46,-893, Example 10) in 0.5 cc. of dimethylformamide is treated with 114 mg. of $N^\alpha$-trityl-$N^\epsilon$-tertiary butyloxycarbonyl - L - lysyl - L - prolyl-L-valyl-glycine and 2 cc. of acetonitrile, then cooled to −15° C. and 38 mg. of dicyclohexylcarbodiimide are added. The whole is kept for 30 minutes at −15° C. and then for 2 days at 2° C. and the precipitate is suctioned off and washed with a small amount of acetonitrile and methanol, to yield 25 mg. of dicyclohexyl urea. The filtrate is evaporated to dryness and the residue is triturated and thoroughly washed successively with petroleum ether, ice-cold dilute acetic acid solution, water, sodium bicarbonate solution and water. The product is dried in vacuo and purified by being dissolved in ethyl acetate and precipitated with much ether, the undissolved matter finally being triturated with a small amount of ice-cold acetone, to yield the pure nonapeptide derivative as a powder melting at 153 to 170° C. which is insoluble in acetone. Optical rotation $$[\alpha]_D^{26} = -14.3° \pm 1.0°$$

(c.=1.13 in dimethylformamide).

*Analysis.*—$C_{85}H_{132}O_{20}N_{20}$, calculated: N, 15.97%. Found: 15.88%.

The ultraviolet spectrum in rectified alcohol contains the maximum characterizing the guanidine-nitro group at 270 m$\mu$, log $\epsilon$=4.51.

After hydrolysing a specimen of the nonapeptide derivative with concentrated hydrochloric acid (1 hour at 40° C.), the resulting L-lysyl-L-prolyl-L-valyl-glycyl-L-lysyl-L-lysyl-nitro-L-arginyl-nitro-L-arginyl-L-proline proves to be substantially unitary in the paper chromatograms. Rf(40)=0.0; Rf(54)=0.10; distance travelled=11.5 cm. after 39 hours in system 45.

(b) $N^\alpha$ - (phenylazo - benzyloxycarbonyl) - $N^\epsilon$ - tertiary butyloxycarbonyl - L - lysyl - L - prolyl - L - valyl-glycyl - ($N^\epsilon$ - tertiary butyloxycarbonyl)- L - lysyl - $N^\epsilon$-tertiary butyloxycarbonyl)-L-lysyl-nitro-L-arginyl-nitro-L-arginyl-L-proline-tertiary butyl ester (1) *Preparation by the mixed anhydride method.*—A solution of 949 mg. of $N^\alpha$-(phenylazo-benzyloxycarbonyl) - $N^\epsilon$-tertiary butyloxycarbonyl-L-lysyl-L-prolyl-L-valyl-glycine (prepared as described in the afore-mentioned patent application Serial No. 46,893, Example 12) in 10 cc. of absolute dimethylformamide is treated with 0.20 cc. of absolute triethylamine. The whole is then cooled to 0° C. and 0.12 cc. of chloroformic acid ethyl ester is added. After 30 minutes at 0° C. a solution of 715 mg. of $N^\epsilon$-tertiary butyloxycarbonyl-L-lysyl-($N^\epsilon$-tertiary butyloxycarbonyl) - L - lysyl - nitro - L - arginyl-nitro-L-arginyl-L-proline tertiary butyl ester (prepared as described in the aforementioned patent application Serial No. 46,893, Example 10) in 15 cc. of absolute dimethylformamide is added and the solution is kept for 22 hours at room temperature. The dimethylformamide is then distilled off in a high vacuum at a bath temperature of 40° C. and the residue is cooled with ice and thoroughly triturated and washed successively with water, dilute citric acid solution, dilute sodium bicarbonate solution and water. After drying over sulfuric acid there are obtained 1.49 grams of an orange powder melting at about 110 to 145° C. To purify the product it is dissolved in acetone and precipitated with ether. Repetition of this reprecipitation yields 944 mg. of pure, protected nonapeptide derivative in the form of an orange, firm powder melting at 135 to 160° C.

(2) *Preparation by the carbodiimide method.*—A solution of 70 mg. of $N^\alpha$-PZ-$N^\epsilon$-BOC-L-lysyl-L-prolyl-L-valyl-glycine (afore-mentioned patent application Serial No. 46,893, Example 12) and 800 mg. of $N^\alpha$-T-$N^\epsilon$-BOC-L-lysyl - $N^\epsilon$ - BOC-L-lysyl-nitro-L-arginyl-nitro-L-arginyl-L-proline-tertiary butyl ester (afore-mentioned patent application Serial No. 46,893, Example 10) in 10 cc. of absolute dimethylformamide is cooled to −10° C. and 250 mg of dicyclohexylcarbodiimide are added. The mixture is kept for 30 minutes at −10° C. and then for 2 days at 2° C. and the precipitated dicyclohexyl urea is suctioned off, the filtrate is freed from dimethylformamide in a high vacuum at 40° C., evaporated, and the residue is freed from excess dicyclohexyl-carbodiimide by being repeatedly triturated with petroleum ether. The powder is insoluble in petroleum ether; it is washed as described under 1 above and reprecipitated from acetone-ether, to yield 720 mg. of nonapeptide derivative melting at about 130 to 160° C. The product still contains a small amount of dicyclohexyl urea which is removed by dissolving the orange powder with heating in a minimum of methanol and keeping the solution at 0° C., whereupon dicyclohexyl urea separates in crystalline form; it is suctioned off and the nonapeptide derivative is obtained by precipitation of the filtrate with ether.

(c) $N^\alpha$ - carbobenzoxy -$N^\epsilon$- tertiary butyloxycarbonyl - L-lysyl - L-prolyl-L-valyl-glycyl-($N^\epsilon$-tertiary butyloxycarbonyl)-L-lysyl-($N^\epsilon$-tertiary butyloxycarbonyl)-L-lysyl-nitro-L-arginyl-nitro-L-arginyl-L-proline-tertiary butyl ester As described under (b) above $N^\alpha$-carbobenzoxy-$N^\epsilon$-tertiary butyloxycarbonyl - L - lysly-L-prolyl-L-valyl-glycyl-($N^\epsilon$-tertiary butyloxycarbonyl)-L-lysyl-($N^\epsilon$-tertiary butyloxycarbonyl) - L - lysyl-nitro-L-arginyl-nitro-L-arginyl-L-proline-tertiary butyl ester can be prepared by condensing $N^\epsilon$-tertiary butyloxycarbonyl-L-lysyl-($N^\epsilon$-tertiary butyloxycarbonyl) - L - lysyl-nitro-L-arginyl-nitro-L-arginyl-L-proline-tertiary butyl ester with $N^\alpha$-carbobenzoxy-$N^\epsilon$- tertiary butyloxycarbonyl - L-lysyl-L-prolyl-L-valyl-glycine. This compound is obtained in the following manner:

(a) $N^\alpha$-*Carbobenzyloxy*-$N^\epsilon$-*tertiary butyloxycarbonyl-L-lysyl-L-prolyl-L-valyl-glycine ethyl ester*

A solution of 44.4 grams of L-prolyl-L-valyl-glycine ethyl ester (prepared as described in the aforementioned patent application Serial No. 46,893, Example 11) and 62.0 grams of $N^\alpha$-carbobenzoxy-$N^\epsilon$-tertiary butyloxy- carbonyl-L-lysine (prepared as described in the aforementioned patent application Serial No. 46,893, Example 2) in 1 liter of acetonitrile is cooled to −10° C., whereupon the whole solidifies to form a gel. (The salt forms from the two components.) Disregarding this, a solution of 36.7 grams of dicyclohexylcarbodiimide in a small amount of acetonitrile is added and the whole is vigorously stirred. The gelatinous salt gradually passes into solution and the dicyclohexyl aurea begins to separate out. After 15 hours at 2° C. the whole has solidified again (mixture of crystalline dicyclohexyl urea and gelatinous tetrapeptide derivative). The latter is dissolved by adding much acetone, and the undissolved dicyclohexyl urea is then suctioned off. Yield: 37.5 grams. M.P. 222 to 225° C. The filtrate is evaporated, the residue taken up in much ethyl acetate, and washed while being cooled with ice with dilute citric acid solution, sodium bicarbonate solution and sodium sulfate solution. After drying with sodium sulfate and evaporating, the residue is crystallized from a small amount of acetone, to yield 85 grams of tetrapeptide derivative melting at 132 to 135° C. For analysis the product is repeatedly recrystallized from acetone. The analytically pure product melts at 133 to 135° C. Optical rotation $[\alpha]_D$= −78° (in rectified alcohol). Instead of by the process described in the afore-mentioned patent application Serial No. 46,893 the $N^\epsilon$-BOC-L-lysine can also be made a follows:

2.05 g. of L-lysine (prepared from the monohydrochloride with Amberlite IRA–410), 1.33 g. of tertiary butyl-phenyl-carbonate, 10 cc. of water, and 10 cc. of methanol are stirred for 16 hours at 60° C. The solution is slightly acidified at 0° C. with 2 N-acetic acid, extracted three times with ether, and the aqueous solution then stirred at 0° C. for 30 minutes with about 100 cc. of Amberlite XE–64. The ion exchanger is filtered off, the filtrate filtered through a smal column charged with the same ion exchanger, and then concentrated at 40° C. under reduced pressure until crystallization is achieved. After being allowed to stand for a short while at 0° C., the gelatinous crystallisate of $N^\epsilon$-BOC-lysine is filtered off with suction, washed once with ice-cold water, and dried at room temperature under reduced pressure.

Yield: 1360 mg.=80%, calculated on tertiary butylphenyl carbonate, or 40%, calculated on lysine.

The product is unitary according to paper chromatography. The excess lysine can be recovered from the ion exchanger.

The $N^\epsilon$-BOC-lysine can also be prepared with tertiary butyl-para-nitrophenyl-carbonate to give a 76% yield, calculated on lysine.

The product can be carbobenzoxylated in known manner, for example by reaction with carbobenzoxy chloride and sodium hydroxide solution according to the process described in the afore-mentioned patent application Serial No. 46,893, Example 2.

(b) $N^\alpha$-*Carbobenzyloxy*-$N^\epsilon$-*tertiary butyloxycarbonyl-L-lysyl-L-prolyl-L-valyl-glycine*

A solution of 660 mg. of the tetrapeptide derivative obtained as described above under (a) in 20 cc. of rectified alcohol is treated with 3 cc. of water, cooled to 2° C., and 1.1 cc. of N-sodium hydroxide solution are added. After 2 hours at 2° C., 50 cc. of water are added, the pH value of the solution is adjusted to about 8 by adding a small amount of solid carbon dioxide, and the alcohol is distilled off in vacuo. The remaining aqueous solution is freed by filtration from a small amount of undissolved matter, cooled to 2° C. and acidified with citric acid to pH=2. The tetrapeptide acid settles out as a finely floccular precipitate which is suctioned off, repeatedly washed with ice water and dried over sulfuric acid, to yield 600 mg. of $N^\alpha$-carbobenzyloxy-$N^\epsilon$-tertiary butyloxy-carbonyl-L-lysyl-L-prolyl-L-valyl-glycine in the form of a fine powder melting at about 80 to 100° C. The product can be further reacted without first having been purified.

*Example 4.—$N^\epsilon$-tertiary butyloxycarbonyl - L - lysyl-L-prolyl-L-valyl-glycyl-($N^\epsilon$-tertiary butyloxycarbonyl)-L-lysyl-($N^\epsilon$-tertiary butyloxycarbonyl)-L - lysyl-nitro-L-arginyl-nitro-L-arginyl-L-proline-tertiary butyl ester*

The trityl-nonapeptide derivative obtained as described in Example 3 is selectively detritylated as follows:

A solution of 20 mg. of the product insoluble in acetone in 0.5 cc. of aqueous acetic acid of 75% strength is kept for 30 minutes at 30° C., evaporated to dryness, and the residue is freed from triphenyl carbinol by being repeatedly triturated with ether. The residue insoluble in ether is freed from acetic acid by being dissolved in a small amount of n-butanol saturated with water. The butanol solution is washed with a small amount of saturated potassium carbonate solution and dilute sodium sulfate solution while being cooled with ice, dried with sodium sulfate and evaporated, to yield 15 mg. of a colorless glass. Paper chromatography reveals the following values: Rf (42)=0.86; Rf (41)=0.87; Rf (40)=0.91.

*Example 5.—$N^\epsilon$-tertiary butyloxycarbonyl-L-lysyl - L-prolyl-L-valyl-glycyl-($N^\epsilon$-tertiary butyloxycarbonyl)-L-lysyl-($N^\epsilon$-tertiary butyloxycarbonyl)-L-lysyl-L-arginyl-L-arginyl-L-proline-tertiary butyl ester*

(1) (a) *Acetate.*—A solution of 19 mg. of the nonapeptide derivative obtained in Example 4 in 3 cc. of methanol is treated with 0.1 cc. of N-aqueous acetic acid and hydrogenated in the presence of 20 mg. of palladium black (10% Pd). After 4 hours the hydrogenation is complete. The catalyst is suctioned off, washed on the filter with a little dilute acetic acid and the filtrate is evaporated. The residue still contains some ammonium acetate (ammonia arising from the reduction of the guanidine-nitro groups) which is removed by dissolving the mixture several times in a small amount of water and lyophilizing the solution, whereupon the ammonium acetate slowly disappears by sublimation. This operation is repeated until ammonium salt can no longer be detected in the residue. The product is converted into the tritosylate as described below. Rf (45)=0.91; Rf (48)=0.80.

(b) *Tritosylate.*—The ammonium-free residue obtained as described above under (a) is dissolved in water, and while being cooled to 2° C. treated with the accurately calculated amount (3 equivalents) of 0.1 N-aqueous para-toluene-sulfonic acid solution, whereupon part of the tritosylate of the nonapeptide separates in smeary form. Disregarding this, the mixture is immediately deepfrozen at —80° and freeze-dried. The almost colorless residue (powder) is triturated with much ether. The product is sufficiently pure for further reactions.

(2) A solution of 875 mg. of the nonapeptide derivative obtained in Example 3(b) in 40 cc. of methanol is treated with 5 cc. of N-acetic acid and the solution is hydrogenated in the presence of palladium black (10% Pd). The carbon dioxide evolved during the hydrogenation is collected in another hydrogenation vessel filled with sodium hydroxide solution. On completion of the hydrogenation the catalyst is suctioned off and washed with much methanol and acetic acid of 1% strength, and the filtrate is evaporated to dryness in vacuo. To free it from the aniline and toluidine formed during the hydrogenation, the residue is distributed between ether and water and the aqueous phase is washed 3 times with ether. To free it from the ammonia formed during the hydrogenation, the aqueous phase is adjusted with triethylamine to pH=10, then immediately evaporated and dried in a high vacuum. A specimen of the residue displays no absorption in the ultra-violet spectrum at 270 mµ such as is typical of the guanidine-nitro radical. The evaporation residue is then dissolved in 10 cc. of water and while being cooled with ice treated portionwise with a total of 4.5 cc. of 0.5 N-aqueous para-toluenesulfonic acid solution (pH about 2.5), then immediately frozen and lyophilized. The dry residue is freed from the excess para-toluenesulfonic acid and triethylamine-para-toluenesulfonate by being repeatedly triturated with ether, to yield 644 mg. of tri-para-toluenesulfonate of the nonapeptide derivative. According to its behaviour in paper chromatography the product is identical with the substance described under (1) above.

(3) In an analogous manner the acetate and the tritosylate of the above nonapeptide derivatives can also be prepared by catalytic hydrogenation of the $N^\alpha$-carbo-benzoxy-$N^\epsilon$-tertiary butyloxycarbonyl-L-lysyl-L-prolyl-L-valyl-glycyl-($N^\epsilon$ - tertiary butyloxycarbonyl)-L-lysyl-($N^\epsilon$-tertiary butyloxycarbonyl)-L - lysyl-nitro-L-arginyl-nitro-L-arginyl-L-proline-tertiary butyl ester prepared as described in Example 3(c).

*Example 6.—Tertiary butyloxycarbonyl - L - seryl - L-tryrosyl - L - seryl - L - methionyl - L - glutaminyl - L-histidyl - L - phenylalanyl - L - arginyl - L - tryptophyl-glycine - ϵ - tertiary butyloxycarbonyl - L - lysyl - L-prolyl - L - valyl - glycyl - ϵ - tertiary butyloxycarbonyl-L - lysyl - ϵ - tertiary butyloxycarbonyl - L - lysyl - L-arginyl - L - arginyl - L -prolyl - tertiary butyl ester-acetate-ditoluenesulfonate*

400 mg. (0.2 mmol) of ϵ-BOC-lysyl-propyl-valyl-glycyl-ϵ - BOC - lysyl - ϵ - BOC - lysyl - arginyl - arginyl-proline-tertiary butyl ester-tri-toluenesulfonate are dissolved with slight heating in 5 cc. of freshly distilled dimethylformamide, and the solution is cooled to 0° C. and treated with 0.3 cc. of a triethylamine solution of 10% strength in dimethylformamide (0.22 mmol). The whole is stirred for 40 minutes at 0° C., a solution of 440 mg. (0.3 mmol) of BOC - ser - tyr - ser - met - glu($NH_2$) - his - phe - arg-try-gly-OH, acetate (afore-mentioned patent application Serial No. 114,636, Example 5) in 10 cc. of dimethylformamide is added, the mixture is stirred for another 10 minutes and then treated with 125 mg. (0.6 mmol) of N:N′-dicyclohexylcarbodiimide. The whole is allowed to react for 2 days at 0° C. and then for one day at room temperature, the precipitated dicyclohexyl urea is filtered off and the crude reaction product is precipitated with much ethyl acetate. The precipitate is filtered through a glass frit. After drying in a high vacuum over phosphorus pentoxide there are obtained 700 mg. of crude butyloxycarbonyl-nonadecapeptide - ester acetate ditoluenesulfonate.

The paper chromatograms in systems 45 and 54 contain in addition to a small amount of starting peptides a new spot which is different from the BOC-decapeptide and nonapeptide ester and gives a positive Pauly and Sakagiuchi reaction and a negative ninhydrin reaction.

The protected nonadecapeptide-tertiary butyl ester can be further reacted as it is.

*Example 7.—L - seryl - L - tyrosyl - L - seryl - L - methio-nyl - L - glutaminyl - L - histidyl L - phenylalanyl-L-arginyl - L - tryptophyl - glycine - L - lysyl - L - prolyl-L - valyl - glycyl - L - lysyl - L - lysyl - L - arginyl-L - arginyl - L - proline hexaacetate*

A mixture of 700 mg. of BOC-nonadecapeptide-tertiary butyl ester and 7 cc. of anhydrous trifluoroacetic acid is kept for 1 hour at room temperature. The trifluoroacetic acid is then evaporated in vacuo at 40° C. and the syrupy residue is repeatedly triturated with much absolute ether, whereupon the trifluoroacetate of the nonadecapeptide is obtained as a slightly pinkish powder. The compound is dried in a high vacuum, dissolved in 2 cc. of water and washed with a further 60 cc. of water through an ion-exchange column of Amberlite IR–4B in the acetate form.

The aqueous solution is lyophilized, to yield 300 mg. of crude nonadecapeptide hexaacetate as a hygroscopic compound.

Total hydrolysis reveals the presence of all desired amino acids. In the test according to Sayers the nonadecapeptide displays ACTH activity.

*Example 8.*—(*a*) *Carbobenzoxy-L-glutamic acid-α-benzylester-γ-tertiary butyl ester*

A mixture of 8.3 grams of carbobenzoxy-L-glutamic acid-α-benzyl ester (H. Sachs and E. Brand, J. Amer. Chem. Soc., 75, page 4610 [1953]) and 25 cc. of absolute dioxane is cooled in an autoclave to −10° C. 95 cc. of liquefied isobutylene and 0.42 cc. of concentrated sulfuric acid are then added, the autoclave is closed and the mixture is shaken for 20 hours at 20° C. After about 2 hours the initially two-phase mixture becomes homogeneous. For working up 100 cc. of water are added, the isobutylene is evaporated and the residue extracted twice with 70 cc. of ether on each occasion. The combined ether portions are freed from unreacted starting material by being extracted four times with 50 cc. of saturated sodium bicarbonate solution on each occasion at 0° C., and the organic phase is washed until neutral, dried over magnesium sulfate and evaporated to dryness. A colorless oil is obtained which crystallizes after some time and after having been dried in a high vacuum melts at 40 to 44° C. Yield: 6.02 grams=63% of the theoretical. The compound can be recrystallized from ethyl acetate+petroleum ether and melts then at 46 to 48° C.

When the aqueous sodium bicarbonate solution is acidified and extracted with ether, 3.2 grams of unreacted starting material can be recovered.

(*b*) *Carbobenzyloxy-L-glutamic acid-α-ethyl-γ-tertiary butyl ester*

A solution of 3.5 grams (11 mmols) of carbobenzoxy-glutamic acid-α-ethyl ester (F. Weygand and K. Hunger, Z. Natf., 13b, page 50 [1958]) in 15 cc. of absolute dioxane containing 0.25 cc. of concentrated sulfuric acid is cooled in a mixture of carbon dioxide and acetone, and 85 cc. of isobutylene dried over sodium are condensed into the reaction vessel with exclusion of moisture. The reaction mixture is agitated for 2 days at room temperature. The clear solution is mixed with 10 cc. of N-sodium bicarbonate solution and the isobutylene and the dioxane are evaporated in vacuo at room temperature.

The evaporation residue is taken up in ether and washed alternately with N-sodium bicarbonate solution and with water until an acidified specimen of the alkaline extraction solution no longer turns turbid. The ether extracts are washed with water until neutral, dried over sodium sulfate and evaporated to dryness in vacuo at 40° C., to yield 3.6 grams (=90% of the theoretical yield) of oily carbobenzoxy-glutamic acid-α-ethyl-γ-tertiary butyl ester.

The crude mixed diester is further reacted without first having been purified.

*Example 9.*—*Carbobenzoxy-L-glutamic acid-γ-tertiary butyl ester*

(a) A solution of 5.5 grams of carbobenzoxy-L-glutamic acid-α-benzyl ester-γ-tertiary butyl ester in 25 cc. of ethanol and 5 cc. of water is mixed with 15.2 cc. of N-sodium hydroxide solution and stirred at 20° C. The initially precipitating oil dissolves in the course of 5 minutes. After a total of 10 minutes 17 cc. of N-hydrochloric acid are added, the whole is mixed with 50 cc. of water and extracted twice with 80 cc. of ether on each occasion. The organic phases are washed until neutral, dried with magnesium sulfate and evaporated. After drying at 50° C. in a high vacuum, there are obtained 4.14 grams of a colorless viscid oil (=95% of the theoretical yield) which is further used as it is. (In the above treatment with sodium hydroxide solution only traces of the tertiary butyl ester group undergo hydrolysis.) In System 45 the compound displays a unitary spot, R*f*=0.85.

(b) 2.7 grams (7.4 mmols) of carbobenzoxy-glutamic acid-α-ethyl-γ-tertiary butyl ester are hydrolysed in 20 cc. of dioxane of 90% strength and 8.1 cc. of N-sodium hydroxide solution for 10 minutes at room temperature, then neutralized with 8.1 cc. of N-hydrochloric acid, and the solvent is evaporated in vacuo at 40° C. The evaporation residue is taken up in ether, once more washed with 10 cc. of 0.1 N-hydrochloric acid and finally with tap water until it is neutral. After drying over sodium sulfate and evaporating the ether, there are obtained 2.3 grams of crude oily hydrolysis product.

*Dicyclohexylamine salt.*—To free it from the neutral constituents, the 2.3 grams of the hydrolysis product are taken up in 100 cc. of ether and 2 cc. of dicyclohexylamine are added. The dicyclohexylamine salt of carbobenzoxy-glutamic acid-γ-tertiary butyl ester soon separates out in the form of fine white needles. After leaving the whole to itself for 4 hours, the crystals are filtered off, thoroughly washed with ether and the salt is dried under reduced pressure.

Yield: 3.0 grams (=83% of the theoretical). Melting point=(129) 138 to 139° C.

The dicyclohexylamine salt of carbobenzoxy-glutamic acid-γ-tertiary butyl ester can be recrystallized from much hot water or methanol of 50% strength; M.P.=139 to 140° C.

The crude and crystalline compound is paper-chromatographically unitary; its R*f* value in system 45 is 0.85.

The dried chromatogram is sprinkled with an ethanolic solution of acridine of 0.005% strength and the spots are then determined in ultra-violet light.

*Scission of the dicyclohexylamine salt.*—A solution of 3.0 grams of salt in 60 cc. of ethanol of 50% strength is treated with 5 cc. of Dowex 50 X–8 and the mixure is shaken for 30 minutes at room temperature. The solution is freed from ion-exchange resin and evaporated in a water-jet vacuum at 40° C. to a small volume; the residue is taken up in ether and the solution is dried over sodium sulfate and evaporated, to yield 1.95 grams (100% of the theoretical yield) of paper chromatographically pure carbobenzoxy-glutamic acid-γ-tertiary butyl ester in the form of an oil.

(c) 2 grams of carbobenzoxy-L-glutamic acid are dissolved in an autoclave in 6 cc. of absolute dioxane, cooled to −10° C. and covered with 25 cc. of liquefied isobutylene and 0.1 cc. of concentrated sulfuric acid. The mixture is agitated for 5 hours at 20° C. and the initially two-phase mixture becomes homogenous after about 2 to 3 hours. 30 cc. of water are added, about two-thirds of the isobutylene are evaporated, the remainder is mixed with 50 cc. of ethyl acetate, and the organic phase is washed with water, dried over magnesium sulfate and evaporated. When the colorless oily residue is heated for a short time in a vacuum at 50° C., there are obtained 2.46 grams of a crude product consisting of carbobenzoxy-L-glutamic acid, carbobenzoxy-L-glutamic acid-α-tertiary butyl ester, carbobenzoxy-L-glutamic acid-γ-tertiary butyl ester and carbobenzoxy-L-glutamic acid-α:γ-di-tertiary butyl ester. The yields, calculated on the carbobenzoxy-L-glutamic acid used as starting material, are, respectively, 15, 25, 35 and 25% in the above order. From this mixture the bulk of the sparingly soluble carbobenzoxy-L-glutamic acid is first removed by crystallization from a 1:1-mixture of methylene chloride and petroleum ether. When the filtrate is evaporated to dryness, the residue dissolved in ether and treated with slightly more than the calculated amount of dicyclohexylamine, the sparingly soluble derivative of carbobenzoxy-L-glutamic acid-α-tertiary butyl ester first separates out, together with a small amount of the bis-dicyclohexylamine salt of carbobenzoxy-L-glutamic acid. On repeated crystallization from methanol+ether and aqueous ethanol, the mother liquor yields the dicyclohexylamine salt of carbobenzoxy-L-glutamic acid-γ-tertiary butyl ester, melting at 138° to 140° C.

*Example 10.—Carbobenzoxy-(γ-tertiary butyl)-L-glutamyl-L-histidine methyl ester*

719 mg. of carbobenzoxy-L-glutamic acid-γ-tertiary butyl ester in admixture with 432 mg. of L-histidine methyl ester (M.P. 58 to 61° C.) are dissolved in 6 cc. of acetonitrile, the whole is cooled to 0° C., and 527 mg. of solid dicyclohexyl-carbodiimide are added. The mixture is stirred for 4 hours at 0° C. and then for 12 hours at 25° C. Finally, the precipitated dicyclohexyl urea is filtered off, rinsed with a small amount of ethyl acetate and from the filtrate the dipeptide is precipitated in gelatinous form by adding 60 cc. of petroleum ether. The mixture is filtered, the residue washed with petroleum ether and the crude products is dried. Reprecipitation from ethyl acetate+ether yields 892 grams (=86% of the theoretical yield) of pure product in the form of a white microcrystalline powder melting at 116° C. $Rf$ (49)=0.96; $Rf$ (54)=0.95. After eliminating the tertiary butyl ester group (5 minutes standing at 20° C. with trifluoroacetic acid) the following values are found: $Rf$ (49)=0.69; $Rf$ (54)=0.78.

*Example 11.—Carbobenzoxy-(γ-tertiary butyl)-L-glutamyl-L-histidine*

A solution of 488 mg. of carbobenzoxy-(γ-tertiary butyl)-L-glutamyl-L-histidine methyl ester in 1.5 cc. of methanol is hydrolysed by being kept with 1.2 cc. of N-sodium hydroxide solution for 8 minutes at 20° C. 1.2 cc. of N-hydrochloric acid are added and the mixture is reduced in vacuo to half its volume. The peptide is extracted with 20 cc. of n-butanol and the butanol phase is then repeatedly washed with about 3 cc. of water on each occasion until the chloride test shows a negative result. The butanol is evaporated almost completely and from the oily residue the peptide is precipitated in a gelatinous form by adding ethyl acetate and petroleum ether. The mixture is filtered, the residue washed with petroleum ether and dried and the resulting crude product is reprecipitated from methanol-ethyl acetate-petroleum ether, to yield 402 mg. of pure product (=85% of the theoretical yield), melting unsharply at about 120°. Paper chromatography reveals the compound to be unitary. $Rf$ (49)=0.84; $Rf$ (54)=0.90. After elimination of the tertiary butyl ester group with trifluoracetic acid (5 minutes at 20° C.) the following values are found: $Rf$ (49)=0.44; $Rf$ (54)=0.77.

*Example 12.—Carbobenzoxy-(γ-tertiary butyl)-L-glutamyl-L-histidine hydrazide*

2.44 g. (5 mmol) of carbobenzoxy-(γ-tertiary butyl)-L-glutamyl-L-histidine-methyl ester, dissolved in 20 cc. of absolute ethanol, are cooled to 0° C. and treated with 0.8 cc. of hydrazine hydrate. The mixture is kept at room temperature for 60 hours, the alcohol evaporated until a small volume of it remains and the residue is treated with much ether. The carbobenzoxy-dipeptide hydrazide precipitates as a greasy product which on prolonged standing at 0° C. and repeated scratching solidifies. The bulk of the hydrazide precipitates in the form of a gelatinous product. It is allowed to stand for 10 hours at 0° C., the gelatinous precipitate is filtered through a G-2 glass frit, flushed with much ether and petroleum ether, and finally dried at 40° C., in a high vacuum. Yield: 2.3 g. (94% of theory); melting point, 119–120° C.

The hydrazide dissolves well in cold ethanol or methanol, but sparingly in ethyl acetate, even at a raised temperature. After repeated recrystallization from a mixture of methanol and water, the analytically pure preparation melts at 140–142° C. (sintering at 75° C.). Optical rotation $[\alpha]_D^{26} = -37.8° \pm 0.5°$ (c.=2.333 in N-hydrochloric acid).

*Example 13.—L-phenylalanyl-nitro-L-arginyl-L-tryptophyl-glycine methylester*

3.5 g. (4.6 mmol) of carbobenzoxy-L-phenylalanyl-nitro-L-arginyl-L-tryptophyl-glycine-methylester (aforementioned patent application Ser. No. 822,187, Example 27) are dissolved with slight heating in 8 cc. of glacial acetic acid, the solution cooled to room temperature and treated with 8 cc. of 4 N-hydrobromic acid-glacial acetic acid solution. The mixture is allowed to stand for 60 minutes, the bulk of the glacial acetic acid and the excess of hydrobromic acid evaporated under reduced pressure and the syrupy residue triturated with much absolute ether. The granular, slightly red-colored dihydrobromide is precipitated once from a small amount of absolute methanol by means of much ether, then dried under reduced pressure, and afterwards distributed between 5 cc. of 2 N-sodium carbonate solution and 40 cc. of a 1:1 mixture of chloroform and butanol. The organic phases are treated with sodium carbonate solution until an alkaline reaction to phenolphthalein is achieved, and the aqueous alkaline extracts are extracted twice with chloroform+butanol. The chloroform-butanol solution is washed neutral with water, dried over sodium sulfate, and evaporated under reduced pressure to a small volume after which the tetrapeptide ester is precipitated with much petroleum ether. Yield: 2.4 g. (84% of the theory).

In the Systems 52 and 54 of the paper chromatogram, the peptide ester gives but one Pauly-positive and one Ehrlich-positive speck showing the $Rf$ values of 0.55 and 0.75, respectively.

*Example 14.—Carbobenzoxy - (γ - tertiary butyl)-L-glutamyl - L - histidyl - L - phenylalanyl-nitro-L-arginyl-L-tryptophyl-glycine-methyl ester*

(a) *From dicyclohexyl carbodiimide.*— 474 mg. (1 mmol) of carbobenzoxy-(γ-tertiary butyl)-L-glutamyl-L-histidine and 623 mg. (1 mmol) of L-phenylalanyl-nitro-L-arginyl-L-tryptophyl-glycine-methyl ester are dissolved with heating in 2.5 cc. of absolute dimethyl formamide and 15 cc. of absolute acetonitrile. After cooling to 0° C., 248 mg. (1.2 mmol) of solid dicyclohexyl carbodiimide are added and the mixture stirred for 6 hours at 0° C. and then for 18 hours at 22° C. Finally, the crude product and a little dicyclohexyl-urea are precipitated from the reaction solution by the addition of much dry ether. (Total precipitate, 1020 mg., melting at about 140° C.) The crude product is dissolved in 20 cc. of methanol with the aid of heat and, after cooling, the hexapeptide derivative is precipitated in the form of flakes by the addition of 120 cc. of dry ether. After two or three reprecipitations performed in an analogous manner and working up the mother liquors there is obtained a total of 780 mg. (=72% of the theory) of a slightly brownish, amorphous powder melting at about 155–165° C. In the paper chromatogram the compound has an $Rf$ value of 0.84 in System 49 after elimination of the tertiary butyl ester group with trifluoracetic acid (10 minutes at 20°) and, in the same system, an $Rf$ value of 0.62 after additional hydrolysis of the methyl ester group with N-sodium hydroxide solution in aqueous methanol (5 minutes at 22° C.).

(b) *By means of azide.*—540 mg. (1.1 mmol) of carbobenzoxy - (γ - tertiary butyl)-L-glutamyl-L-histidine hydrazide are dissolved in 4 cc. of N-hydrochloric acid, cooled to 0° C., and treated with 1.2 cc. of ice-cold N-sodium nitrite solution. After 3 minutes the reaction solution is given an alkaline reaction to phenolphthalein with ice-cold 2 N-sodium carbonate solution (2.7 cc.), and the azide which precipitates is extracted twice with 15 cc. of ice-cold ethyl acetate. The ethyl acetate extracts are washed neutral with water (twice 5 cc.), dried over magnesium sulfate at 0° C., and evaporated to a small volume in high vacuum at room temperature.

The azide solution is combined with the ice-cold solution of 475 mg. (0.75 mmol) of L-phenylalanyl-nitro-L-arginyl-L-tryptophyl-glycine-methyl ester in 5 cc. of dimethyl formamide and allowed to react for 60 hours at 0° C. The solvent is evaporated to a small volume in a high vacuum at 40° C., and the reaction product precipitated with much ethyl acetate. The gelatinous precipitate is centrifuged off, washed with much ethyl acetate, ether, and petroleum ether and dried in a high vacuum at room temperature.

The crude product (720 mg.) is reprecipitated from 95% ethanol with ether. Yield: 600 mg. (74% of theory). Melting point =165–170° C.

The compound described under (a) is identical with the above preparation.

*Example 15.—Carbobenzoxy-(γtertiary butyl)-L-glutamyl - L - histidyl - L - phenylalanyl - nitro-L-arginyl-L-tryptophyl-glycine*

45 mg. (0.4 mmol) of carbobenzoxy-(γ-tertiary butyl)-L - glutamyl-L-histidyl-L-phenylalanyl-nitro-L-arginyl-L-L-tryptophyl-glycine-methyl ester in 7.5 cc. of 75% dioxane are hydrolyzed for 4 minutes at room temperature with 0.5 cc. of N-sodium hydroxide solution. The reaction mass is then neutralized with 0.5 cc. of N-hydrochloric acid and the dioxane evaporated at 40° C. under reduced pressure. On dilution of the milky solution with 25 cc. of water the saponification product settles out as a fine precipitate. The whole is allowed to stand at 0° C. for 60 minutes, then filtered, and the precipitate washed with water. After drying in vacuo over phosphorus pentoxide, 435 mg. of crude carbobenzoxy-hexapeptide are obtained. Melting point, 203–206° C. (decomposition).

The carbobenzoxy-hexapeptide can be recrystallized from a large quantity of methanol. Molting point: 209–210° C.

In the paper chromatogram in the Systems 45, 50 and 52, it travel at the same rate as the solvent.

*Example 16.—γ-t-butyl-L-glutamyl-L-histidyl-L-phenylalanyl-L-arginyl-L-tryptophyl-glycine*

975 mg. (0.9 millimols) of carbobenzoxy-(γ-t-butyl)-L - glutamyl - L - histidyl-L-phenylalanyl-nitro-L-arginyl-L-trypotophyl-glycine are agitated in 100 cc. of acetic acid of 90% strength in the presence of 400 mg. of palladium carbon (10%) catalyst for 17 hours under atmospheric pressure and at room temperature in a hydrogen atmosphere. The solution is freed from the catalyst and evaporated to dryness in vacuo at 40° C., and the residue precipitated once from a mixture of methanol and ether. After drying in a high vacuum there are obtained 845 mg. of hexapeptide-γ-tertiary butyl ester.

In the ultraviolet spectrum:

λmax=290 mμ (ε=4800)
λmax=280 mμ (ε=5800)
λmax=274 mμ (ε=5700)

In high voltage electrophoresis the peptide derivative travels at 3000 volts and pH 1.9 within 1 hour 14.5 cm. and shows a positive reaction with Pauly, Ehrlich and Sakaguchi reagents and with ninhydrin.

*Example 17.—Carbobenzoxy - (γ-t-butyl)-L-glutamyl-L-histidyl - L - phenylaalanyl-nitro-L-arginyl-L-tryptophyl-glycyl - ($N^\epsilon$ - t - butyloxycarbonyl)-L-lysyl-L-prolyl-L-valyl - glycyl - ($N^\epsilon$ - t - butyloxycarbonyl)-L-lysyl-($N^\epsilon$-tertiary butyloxycarbonyl)-L-lysyl-nitro-L-arginyl-nitro-L-arginyl-L-proline-t-butylester*

350 mg. of the nonapeptide derivative described in Example 4 and 320 mg. of the hexapeptide derivative described in Example 15 are dissolved in 3 cc. of dimethyl formamide, and 9 cc. of acetonitrile and 100 mg. of dicyclohexylcarbodiimide added. The mixture is left to itself at room temperature for 3 days, the dicyclohexyl urea then filtered off with suction, washed with a small amount of dimethylformamide+acetonitrile, and the filtrate evaporated to dryness. The residue is triturated with much ether, ethyl acetate, and ice-cold acetic acid solution of 1% strength, and the insoluble constituents precipitated from their solution in dimethylformamide by means of a solution of 1% triethylamine in ethyl acetate. This precipitation (separation of the hexapeptide derivative) is repeated three times, and the insoluble constituents (pentadecapeptide derivative) finally triturated with a small amount of methanol. The pentadecapeptide is obtained in the form of a grany gel which is sparingly soluble in methanol and melts at 192–197° C. After removal of the BOC and t-butyl ester groups by means of trifluoracetic acid (1 hour at room temperature, the R*f* value is 0.0 in System 52 and 0.4–0.5 in System 54.

*Example 18.—(γ-t-butyl)-L-glutamyl-L-histidyl-L-phenylalanyl - L - arginyl-L-tryptophyl-glycyl-($N^\epsilon$-t-butyloxycarbonyl) - L-lysyl-L-prolyl-L-valyl-glycyl-($N^\epsilon$-t-butyloxycarbonyl) - L - lysyl - ($N^\epsilon$-t-butyloxycarbonyl)-L-lysyl-L-arginyl-L-arginyl-L-proline-t-butylester*

The pentadecapeptide obtained according to Example 17 is dissolved in acetic acid of 90% strength and the solution agitated for 5 hours in the presence of palladium carbon (10% Pd) under a pressure of hydrogen of 5 atmospheres. Fresh palladium carbon catalyst is then added, and the whole shaken for 12 hours under a hydrogen pressure of 1 atmosphere. The catalyst is then filtered off with suction and the filtrate evaporated to dryness. To remove the ammonium salts formed during hydrogenation, the residue is dissolved in a 1% aqueous triethylamine solution and lyophilized immediately. This treatment is repeated until ammonium salt can no longer be detected in the residue.

The resulting pentadecapeptide derivative in paper electrophoresis (pH=1.9; 45 v./cm.; 1 hour runs a distance of about 12.5–14.2 cm.; positive reatcion with ninhydrin, Sakaguchi, and Folin and Pauly-reagents.

*Example 19. — t-Butyloxycarbonyl - L - seryl-L-tyrosyl-L-seryl-L-methionyl - (γ-t-butyl)-L-glutamyl - L - histidyl - L - phenylalanyl - L - arginyl-L-tryptophyl-glycyl ($N^\epsilon$-t-butyloxycarbonyl)-L-lysyl - L - prolyl - L -valyl-glycyl-($N^\epsilon$-t-butyloxycarbonyl)-L-lysyl - ($N^\epsilon$ - t - butyloxycarbonyl) - L - lysyl-L-arginyl-L-arginyl-L-proline-t-butyl ester.*

60 mg. of the pentadecapeptide derivative obtained according to Example 18 are dissolved in 1 cc. of dimethyl formamide and 0.2 cc. of water. The solution is treated at 2° C. with 0.01 cc. of triethylamine and 30 mg. of BOC - L-seryl-L-tyrosyl-L-seryl-L-methionine-azide (prepared according to the aforementioned patent application Ser. No. 114,636, [Example 10]) and left to itself for 3 days at 2° C., then for 5 hours at room temperature. The solution is then evaporated to dryness, and the residue thoroughly washed with much ether and ethyl acetate while being triturated. The crude, protected nonadecapeptide derivative still contains some pentadecapeptide derivative in admixture.

Splitting off the BOC and t-butylester groups and conversion into the acetate form is performed as described in Example 7. The resulting free nondecapeptide has the same properties as the product described in Example 7.

What is claimed is:

1. Nonadecapeptides of the formula L-seryl-L-tyrosyl-L-seryl-L-(X)-L-glutaminyl-L-histidyl - L - phenylalanyl-L - arginyl - L-tryptophyl-glycyl-L-lysyl-L-prolyl-L-valyl-glycyl-L-lysyl-L-lysyl-L-arginyl-L-arginyl - L - proline in which X is a member of the group consisting of an unsubstituted and a mercapto-substituted, a lower alkyl mercapto-substituted, a sulfoxy-substituted and a sulfo-substituted α-lower alkyl-α-amino acetic acid the lower alkyl radical of which has at most 4 carbon atoms.

2. Nonadecapeptides of the formula L-seryl-L-tyrosyl-L-seryl-L-(X)-L-glutamyl - L - histidyl - L - phenylalanyl-L-arginyl-L-tryptophyl-glycyl - L - lysyl-L-prolyl-L-valyl-glycyl - L - lysyl-L-lysyl-L-arginyl-L-arginyl-L-proline in which X is a member of the group consisting of an unsubstituted and a mercapto-substituted, a lower alkyl mercapto-substituted, a sulfoxy-substituted and a sulfo-substituted α-lower alkyl-α-amino acetic acid the lower alkyl radical of which has at most 4 carbon atoms.

3. A member selected from the group consisting of L-seryl-L-tyrosyl - L - seryl - L - methionyl-L-glutaminyl-L-histidyl - L - phenylalanyl-L-arginyl-L-tryptophyl - glycyl-L-lysyl-L-propyl-L-valyl - glycyl-L-lysyl-L-lysyl-L-arginyl-L-arginyl-L-proline, its esters, amides and N-acylated derivatives and acid addition salts of therapeutically useful acids.

4. A member selected from the group consisting of L-seryl - L - tyrosyl - L - seryl - L - methionyl-L-glutamyl-L-histidyl-L-phenylalanyl-L-arginyl-L-tryptophyl - glycyl - L-lysyl - L - prolyl - L - valyl-glycyl-L-lysyl-L-lysyl-L-arginyl - L - arginyl - L - proline, its esters, amides and N-acylated derivatives and acid addition salts of therapeutically useful acids.

5. A member selected from the group consisting of L-glutamyl-L-histidyl - L - phenylalanyl - L - arginyl-L-tryptophyl - glycyl - L - lysyl-L-propyl-L-valyl-glycyl - L-lysyl - L - lysyl - L - arginyl-L-arginyl-L-proline, its esters, amides and N-acylated derivatives and acid addition salts of therapeutically useful acids.

6. A member selected from the group consisting of γ-t-butyl-L-glutamyl - L - histidyl - L - phenylalanyl-nitro-L - arginyl - L - tryptophyl - glycine, its carbobenzoxy derivative and acid addition salts thereof.

7. A member selected from the group consisting of N$^\alpha$-carbobenzoxy-N$^\epsilon$-tert.butyloxycarbonyl-L-lysyl-L - propyl-L-valyl-glycine, its lower alkyl esters and acid addition salts thereof.

8. A member selected from the group consisting of N$^\epsilon$-tert.butyloxycarbonyl - L - lysyl - L - propyl-L-valyl-glycyl-N$^\epsilon$-tert.butyloxycarbonyl - L - lysyl - N$^\epsilon$-tert.butyloxycarbonyl-L-lysyl - L - arginyl - L- arginyl - L - proline-tert.butylester and esters, amides and N-acylated derivatives thereof in which the arginyl radical is protected by a nitro group and acid addition salts thereof.

9. Carbobenzoxy-L-glutamic acid-γ-tert.butyl ester.

10. Carbobenzoxy-(γ-tert.butyl)-L-glutamyl - L - histidine.

11. Carbobenzoxy - (γ-tert.butyl) - L - glumatyl-L-histidine-hydrazide.

12. An L-phenylalanyl-nitro - L - arginyl-L-tryptophyl-glycine-lower alkyl ester.

13. A carbobenzoxy - (γ-tert.butyl) - L - glutamyl-L-histidyl-L-phenylalanyl - nitro - L - arginyl-L-tryptophyl-glycin-lower alkyl ester.

References Cited by the Examiner

UNITED STATES PATENTS 3,014,023  12/1961  Schwyzer et al. _____ 260—112

OTHER REFERENCES

Harris, "Nature," vol. 178, page 90 (1956).
Hoffman, "Jour. Am. Chem. Soc.," vol. 79, pages 1636–41, 6087–88 (1957).
Schwyzer, "Nature," vol. 182, pages 1669–70 (1958).
Shepherd, "Jour. Am. Chem. Soc.," vol 78, pp. 5067–76 (1956).
White, "Jour. Am. Chem. Soc.," vol. 77, pages 1711–12 (1955).

LEWIS GOTTS, *Primary Examiner.*

LEON ZITVER, *Examiner.*

DENNIS P. CLARKE, PERRY A. SMITH,
*Assistant Examiners.*